Jan. 17, 1961     I. S. DE WOSKIN     2,968,304
SANITARY PAD AND METHOD OF MAKING
Filed Oct. 4, 1956
FIG. 1.
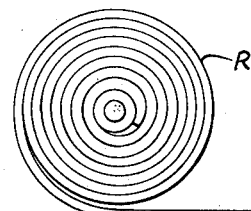
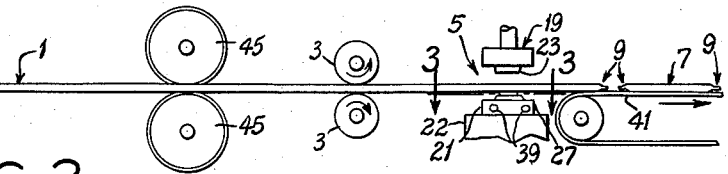
FIG. 2.
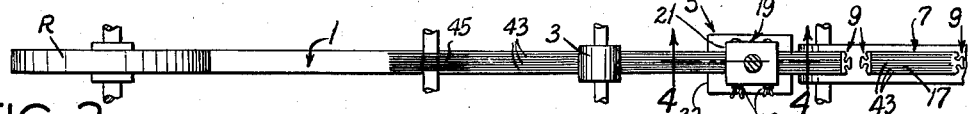
FIG. 3.
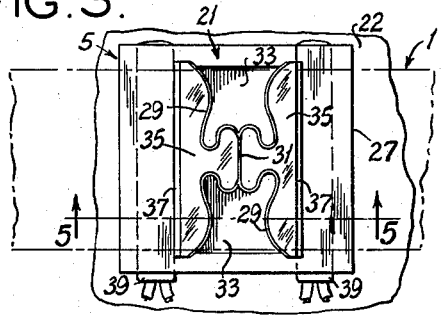
FIG. 4.
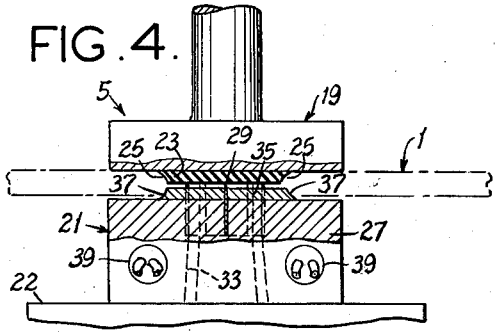
FIG. 5.     FIG. 6.
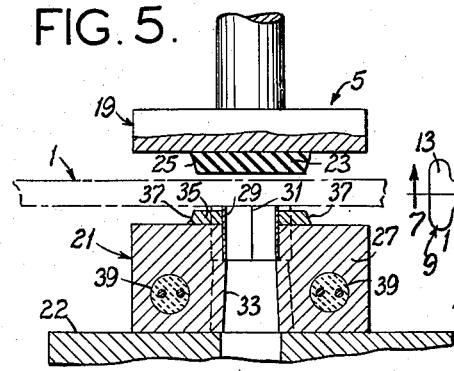
FIG. 7.
FIG. 8.
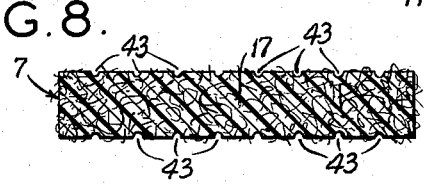
Irvin S. De Woskin,
Inventor.
Koenig and Pope,
Attorneys.

United States Patent Office 2,968,304
Patented Jan. 17, 1961

2,968,304

SANITARY PAD AND METHOD OF MAKING

Irvin S. De Woskin, St. Louis, Mo., assignor to Beltx Corporation, St. Louis, Mo., a corporation of Missouri Filed Oct. 4, 1956, Ser. No. 613,849

9 Claims. (Cl. 128—290)

This invention relates to pads, and more particularly to disposable absorbent pads and the manufacture thereof.

Among the several objects of the invention may be noted the provision of an improved disposable absorbent pad, such as a sanitary napkin, formed with integral means at its ends for attachment to a suitable garment, such as a panty garment, or a belt, the pad being made of a material comprising fibers which are bonded together into a coherent mass by a thermoplastic resin so that no wrapper is needed, and wherein the resin is utilized for the formation of the attaching means at the ends of the pad; the provision of a disposable absorbent pad, such as a sanitary napkin, which is so formed as to channel the flow of liquid on one or the other face of the pad; and the provision of a method for economically manufacturing such pads. Other objects and features will be in part apparent and in part pointed out hereinafter.

The invention accordingly comprises the constructions and methods hereinafter described, the scope of the invention being indicated in the following claims.

Fig. 1 is a semi-diagrammatic view in elevation illustrating the manufacture of sanitary napkins in accordance with this invention;

Fig. 2 is a plan view of Fig. 1;

Fig. 3 is an enlarged view taken on line 3—3 of Fig. 1, showing a die employed in the manufacture of the napkin;

Fig. 4 is a section taken on line 4—4 of Fig. 2, and showing a moved position of parts in respect to Fig. 1;

Fig. 5 is a section taken on line 5—5 of Fig. 4, but showing parts in the Fig. 1 position;

Fig. 6 is a view of one face of a completed napkin of this invention;

Fig. 7 is an edge elevation of the napkin; and,

Fig. 8 is an enlarged transverse section through the napkin taken on line 8—8 of Fig. 6.

Corresponding reference characters indicate corresponding parts throughout the several views of the drawings.

Referring to the drawings, Figs. 1 and 2 illustrate the manufacture of sanitary napkins in accordance with this invention. The napkins are die cut from a continuous strip 1 of absorbent pad material drawn from a supply roll R of the strip by draw rolls such as indicated at 3. In accordance with this invention, the absorbent pad material is of special nature, comprising absorbent-pad-forming fibers which are bonded together into a coherent mass by means of fused thermoplastic resin incorporated therein. One example of a suitable material is a material made by interspersing Dynel (vinyl chloride-acrylonitrile copolymer fibers) in a mass of cotton linters (such as conventionally used for making cotton batting) and fusing the Dynel to bond the cotton linters together, the density of the resultant material being such that it is absorbent. Such material may consist, for example, of ninety percent cotton linters and ten percent Dynel, by weight. The material may comprise other cellulose fibers and other thermoplastic resin binders.

As shown in Figs. 1 and 2, the strip 1 withdrawn from the supply roll R is fed by rolls 3 through a press indicated at 5 which includes means for segmenting the strip into individual napkins 7 of this invention, one of which is illustrated in Figs. 6 and 7, having compressed button-headed ends generally designated 9. These ends 9 are adapted for being buttoned into button holes in a garment (not shown) such as a pantry garment, or a belt. More particularly, each button-headed end includes a generally centrally projecting integral stem portion 11 narrower than the width of the napkin, and an integral head or button 13 at the end of the stem. The head 13 is wider than stem 11 but narrower than the width of the napkin. In the press, end portions of the napkin including the stems 11 and heads 13 and end regions 15 extending across the full width of the napkin are compressed and heated to effect fusion of the thermoplastic resin constituent of the napkin material to retain the end portions compressed so that they are of less thickness, higher density and greater stiffness than the body portion 17 of the napkin between the end regions 15.

By way of illustration, the press 5 may comprise a movable head 19 and a die 21 on the bed 22 of the press. The head 19 has a platen 23 of hard rubber or the like for effecting compression of the napkin ends. The edges of this platen which extend transversely to the strip are beveled as indicated at 25. The die 21 comprises a block 27 having a cutting blade 29 projecting upward therefrom shaped to die out the trailing end of one napkin and the leading end of the next napkin. As will be apparent from Fig. 3, the blade 29 is shaped to die out two portions of the strip at opposite sides of the longitudinal center line of the strip to form the button-headed napkins 7, and to cut through the strip on a transverse line at 31 between the heads or buttons 13 of the trailing and leading napkin ends. The block 27 has tapered openings 33 for dropping out the died-out portions of the strip. The die 21 has metal platens indicated at 35 having beveled edges 37 cooperable with the upper platen 23 for effecting compression of the napkin ends. The shape of each platen 35 in plan corresponds to the outline desired for the stems 11, heads 13 and end regions 15. The blade 29 projects above the platens 35. Electrical resistance heaters such as indicated at 39 are incorporated in the block 27 for heating it to a temperature sufficient to effect re-fusion of the thermoplastic resin constituent of the strip 1.

The strip 1 is intermittently fed forward through the press 5 a distance corresponding to the desired napkin length. During dwell intervals of the strip, the press is operated to bring the press head 19 down toward the die 21 to the point where platen 23 effects compression of the strip against platens 35 to reduce its thickness to about one-quarter its original thickness in the area between the platens, and to the point where blade 29 cuts through the compressed area of the strip to form the button-headed napkin ends and to sever a napkin from the strip at line 31. The strip, in addition to being subjected to pressure over the area between platens, is also subjected to heat from the block 27 sufficient to activate the previously fused thermoplastic resin in the area under pressure. Upon separation of the press head 19 and the die 21, the resin re-solidifies and re-fuses together the compressed fibers in said area so that the napkin ends do not re-expand. It will be understood that while the resin was originally fused to bond the fibers of the napkin material together, being a thermoplastic resin it may be re-fused in press 5 to hold the napkin ends compressed. A conveyor for carrying away the napkins severed from the strip is indicated at 41.

Also in accordance with this invention, the strip 1 of napkin material is provided with longitudinal scores or grooves 43 in both faces as it travels to the press 5. As shown in Fig. 1, these scores are formed by feeding the strip between an upper and lower series of heated presser disks 45 which act to compress the strip over narrow longitudinally extending areas and to activate the thermoplastic resin constituent of the strip in the compressed areas so that the resin fuses and holds these areas compressed to retain the scores in the napkin faces. These scores 43 then appear in the napkins which are segmented from the strip as shown in Figs. 6–8, extending from one end region 15 to the other. They act to channel the flow of liquid on one or the other faces of the napkin lengthwise of the napkin, thereby to avoid undue concentration of absorption in a limited area of the napkin and to avoid lateral spread of liquid outward beyond the napkin. It will be understood that score patterns other than a pattern of longitudinal lines may be used, and that the scores are useful in a napkin whether or not it has the button-headed ends.

It will be understood that the invention is not limited to sanitary napkins, being useful in other fields such as in the field of disposable absorbent diaper pads.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. A pad comprising an absorbent body having at each of its ends an integral projecting stem narrower than the width of the body and an integral head on the end of the stem, said pad being formed of a material comprising fibers bonded together into a coherent mass by means of a thermoplastic resin binder, the material in the body of the pad being of such density as to be absorbent, the material in the stems and heads being compressed and being held compressed by means of fused thermoplastic resin therein so as to be of less thickness, higher density and greater stiffness than the body of the pad, said pad having scores in at least one face thereof formed by compressed portions of the material, the thermoplastic resin in these portions being fused to hold them compressed.

2. A pad to be worn in the crotch comprising an absorbent body having at each of its ends an integral projecting stem narrower than the width of the body and an integral head on the end of the stem, said pad being formed of a material comprising fibers bonded together into a coherent mass by means of a thermoplastic resin binder, the material in the body of the pad being of such density as to be absorbent, the material in end portions of the pad including the stems, heads and end regions extending across the full width of the pad being compressed and being held compressed by means of fused thermoplastic resin therein so as to be of less thickness, higher density and greater stiffness than the body of the pad, and the body of the pad being of substantially full thickness entirely across its width and throughout its length between said end regions.

3. A sanitary napkin comprising an absorbent body having at each of its ends a generally centrally projecting integral stem narrower than the width of the body and an integral head on the end of the stem wider than the stem but narrower than the width of the napkin, said napkin being formed of a material comprising fibers bonded together into a coherent mass by means of a thermoplastic resin binder, the material in the body of the napkin being of such density as to be absorbent, the material in the stems and heads being compressed and being held compressed by means of fused thermoplastic resin therein so as to be of less thickness, higher density and greater stiffness than the body of the napkin, said napkin having scores in both faces thereof formed by compressed portions of the material, the thermoplastic resin in these portions being fused to hold them compressed.

4. A sanitary napkin comprising an absorbent body having at each of its ends a generally centrally projecting integral stem narrower than the width of the body and an integral head on the end of the stem wider than the stem but narrower than the width of the napkin, said napkin being formed of a material comprising fibers bonded together into a coherent mass by means of a thermoplastic resin binder, the material in the body of the napkin being of such density as to be absorbent, the material in end portions of the napkin including the stems, heads and end regions extending across the full width of the napkin being compressed and being held compressed by means of fused thermoplastic resin therein so as to be of less thickness, higher density and greater stiffness than the body of the napkin.

5. A sanitary napkin as set forth in claim 4 further having scores in both faces thereof formed by compressed portions of the material extending between said end regions, the thermoplastic resin in these portions being fused to hold them compressed.

6. The method of making an absorbent pad with button-headed ends comprising subjecting a continuous strip of absorbent pad material having a width corresponding to the desired pad width and comprising fibers bonded together into a coherent mass by a fused thermoplastic resin binder to heat and pressure at pad length intervals only to form compressed portions spaced at pad length intervals held compressed by re-fusion of the resin in said portions, and cutting the strip at said compressed portions on lines for providing button-headed pad ends and for segmenting the strip into individual pads each having compressed button-headed ends and compressed end regions extending across the full width of the pad.

7. The method of claim 6 wherein the cutting is effected simultaneously with the application of heat and pressure.

8. A pad comprising an absorbent body having at each of its ends an integral projecting stem narrower than the width of the body and an integral head on the end of the stem, said pad being formed of a material comprising fibers bonded together into a coherent mass by means of a thermoplastic resin binder, the material in the body of the pad being of such density as to be absorbent, the material in end portions of the pad including the stems, head and end regions extending across the full width of the pad being compressed and being held compressed by means of fused thermoplastic resin therein so as to be of less thickness, higher density and greater stiffness than the body of the pad, said pad having scores in at least one face thereof formed by compressed portions of the material extending between said end regions, the thermoplastic resin in these portions being fused to hold them compressed.

9. A pad comprising an absorbent body having at each of its ends an integral projecting stem narrower than the width of the body and an integral head on the end of the stem, said pad comprising a mass of fibers with the mass in the body of the pad of such density as to be absorbent, the fibrous material in the stems and heads being compressed so as to be of less thickness, higher density and greater stiffness than the body of the pad, said pad having scores in at least one face thereof between said ends formed by compressed portions of the fibrous material, the compression at the regions of the scores being less than at said ends, and said pad having a fused thermoplastic resin binder at the regions of the scores which holds the fibrous material thereat compressed so as to preserve the scores.

(References on following page)

References Cited in the file of this patent

UNITED STATES PATENTS

| | | |
|---|---|---|
| 162,647 | Hatch | Apr. 27, 1875 |
| 791,354 | Merkley | May 30, 1904 |
| 1,825,492 | Wandel | Sept. 29, 1931 |
| 2,229,061 | Eustis | Jan. 21, 1941 |
| 2,320,782 | Larsen | June 1, 1943 |
| 2,566,451 | Julien | Sept. 4, 1951 |
| 2,569,765 | Kellett et al. | Oct. 2, 1951 |
| 2,600,882 | Kellett et al. | June 17, 1952 |
| 2,618,816 | Joa | Nov. 25, 1952 |
| 2,783,474 | Campagna et al. | Mar. 5, 1957 |
| 2,788,003 | Morin | Apr. 9, 1957 |

FOREIGN PATENTS

| | | |
|---|---|---|
| 523,052 | Great Britain | July 4, 1940 |
| 1,064,352 | France | Dec. 23, 1953 |